US 6,628,888 B1

(12) United States Patent
Dumont et al.

(10) Patent No.: US 6,628,888 B1
(45) Date of Patent: Sep. 30, 2003

(54) ARRANGEMENT FOR SUPERIMPOSING TWO IMAGES WITHOUT JITTERING

(75) Inventors: Frank Dumont, Singapore (SG); Chee Lam Tan, Singapore (SG)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/368,508

(22) Filed: Aug. 5, 1999

(30) Foreign Application Priority Data

Aug. 6, 1998 (GB) .............................................. 9817189

(51) Int. Cl.$^7$ ................................................ H04N 5/94
(52) U.S. Cl. .............................. 386/47; 386/48; 386/68; 386/71
(58) Field of Search ............................ 386/46, 47, 48, 386/68, 71, 81, 84, 85, 66

(56) References Cited

U.S. PATENT DOCUMENTS 6,075,917 A * 6/2000 Kim ............................. 386/47
6,078,724 A * 6/2000 Kawase ......................... 386/71

FOREIGN PATENT DOCUMENTS

| GB | 1418545 | 12/1975 |
| GB | 2228645 | 8/1990 |

\* cited by examiner

Primary Examiner—Huy Nguyen
(74) Attorney, Agent, or Firm—Joseph S. Tripoli; Harvey D. Fried; Joseph J. Kolodka

(57) ABSTRACT

In order to avoid, during trick mode, jittering of a second image superimposed on a first image, the arrangement is able to provide a signal including a vertical synchronisation signal and representative of a first image to a screen. The arrangement also generates a second image to be synchronised with the first image. The arrangement is able to perform a pseudo-vertical synchronisation signal.

A selection is made to use whether the vertical synchronisation signal or the pseudo vertical synchronisation signal depending on the mode in which the arrangement is functionning.

4 Claims, 1 Drawing Sheet

ARRANGEMENT FOR SUPERIMPOSING TWO IMAGES WITHOUT JITTERING

FIELD OF THE INVENTION

The invention is in the field of arrangements providing signal representative of at least two images to be displayed superimposed on a screen.

BACKGROUND OF THE INVENTION

For instance, in a VCR a composite video signal is read/recorded from/on a tape, by magnetic reading and writing heads, amplified and then sent to a video integrated circuit that processes the amplified signal received from the heads.

Superimposed, in a known way, to the first image, there could be a second image, e.g. what is known as an On Screen Display (OSD). Such an OSD is most of the time a set of conventional signs or characters which are generated in a devoted circuit (OSD generator) according to control issued by a user, for instance with a remote control. The OSD is generated most of time in a dedicated circuit for instance a microcontroller that receives the orders from the user and displays an image in accordance with said control and a resident software.

The OSD is generated independently from the video signal and must appear at the same place, from an image to the next. That means that said OSD must be synchronised with the main display. In order to synchronise the OSD signal with the displayed image, the OSD devoted circuit receives the horizontal and vertical synchronisation pulses (Hsync and Vsync) from a synchro separator circuit that receives the composite video signal and extracts from it said horizontal and vertical synchronisation pulses. Then by counting beats of a time counter starting from one of the horizontal synchronisation pulses that appears after a determined number of other horizontal synchronisation pulses, starting from each vertical synchronisation pulse, it is possible to find out the instant at which to start the OSD. The synchronisation signal extracted by the synchro separator circuit is known as composite synchronisation signal (Csync). Csync comprises Hsync (horizontal synchronisation) and Vsync (vertical synchronisation).

During Electronic-to-Electronic mode (a mode often said E—E mode, in which recording is not performed, but a signal from a source for instance a video camera, goes through the VTR circuits and can be viewed in a TV monitor) or playback modes, the Csync signal is noise-free. Problem occurs during trick modes such as pause or fast forward or rewind. The sync-separator circuit exhibit "spurious" vertical sync pulses, especially when the playback Frequency Modulated (PB-FM) signal is weak. Said spurious signal appears in the time period that elapses between two frames.

Since the OSD dedicated circuit is using this signal as a reference for OSD generation, the OSD would then jitter vertically. This is highly undesirable, especially during assembly recording when the pause mode is used to view for instance the start & end of each recording sequence, and at the same time, the OSD must be clearly readable.

The purpose of the invention is to solve this problem of vertical jitter that appears each time that a trick mode is used. A trick mode is a mode in which the speed of the tape is different from the normal play speed, for instance pause or fast rewind or forward.

SUMMARY OF THE INVENTION

To get around this problem, according to the invention a switching circuit is implemented to supply the OSD dedicated circuit, which is often a micro controller, with the normal vertical synchronisation signal coming from the synchro-separator circuit during E—E and playback modes, but switch to PV (pseudo-vertical) signal during trick modes such as pause, slow-motion, or search modes. This PV signal is generated during trick modes only. For a VCR an already existing circuit can be used. It is very stable because it is derived from the DFF (Drum flip-flop), which is constructed using information from the drum pickup. It does not depend on the strength of the playback FM or the performance of the synchro-separator circuit.

To sum up the invention is about an arrangement comprising:
- means for providing a signal representative of a first image to a screen, said signal including a vertical synchronisation signal,
- means for providing a pseudo-vertical synchronisation signal,
- generator means for generating a second image, said generator means having at least an input for receiving a signal to synchronise the second image with the first image,
- control means having an output indicating the mode in which the arrangement is functioning,
- selector means for selectively providing said vertical synchronisation signal or said pseudo vertical synchronisation signal to said input depending on the output of the control means.

According to preferred embodiments:
- the generator means comprises an On Screen Display generator,
- the means for providing the signal representative of the first image includes a rotary drum fitted with at least a pair of magnetic heads for reading a magnetic tape,
- the means for providing a pseudo vertical synchronisation signal comprise a control circuit elaborating the pseudo-vertical synchronisation signal on the basis of control pulses generated by the rotary drum,
- the arrangement further includes separator means for taking the vertical synchronisation signal out of the signal representative of the first image,
- the selector means are in the form of a switch with a first input connected to the separator means, with a second input connected to the control circuit with a thirds input connected to the control means and with an output connected to the input of the generator means.

BRIEF DESCRIPTION OF THE DRAWINGS

The invention will now be described in accordance with FIG. 1 which represent a schematic diagram of a part of a VCR fitted with the invention.

DETAILED DESCRIPTION OF A PREFERRED EMBODIMENT

Figure 1:
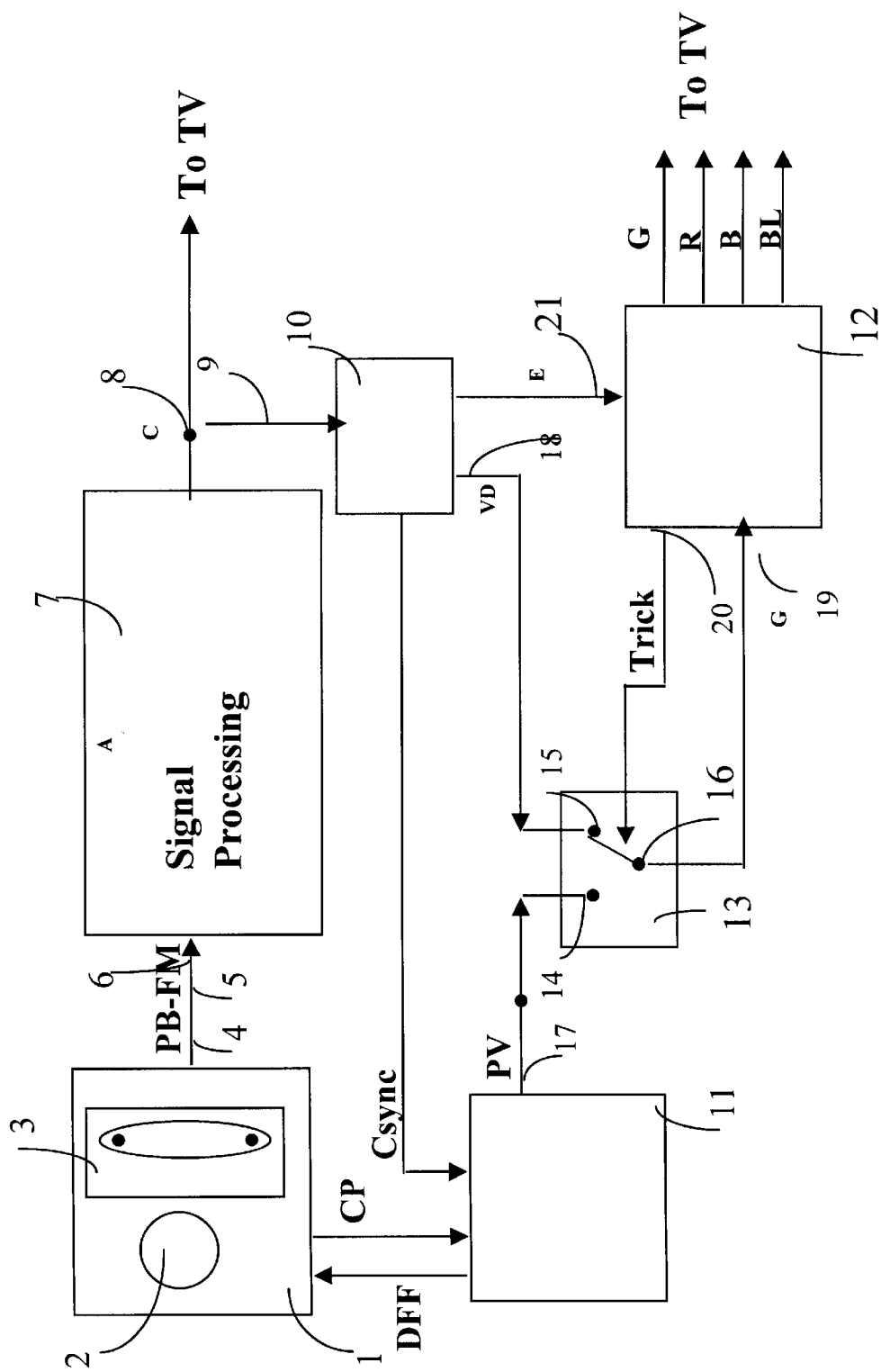

A VCR according to the invention comprises a mechanical deck 1 fitted with a drum 2 around which a cassette or a tape is wounded in a known way for about half a turn. The drum is fitted in a known way with at least a pair of magnetic heads to read and write on the tape. Each head of the pair is active in turn when it arrives on a side of the drum which is in contact with the tape. The change of head is made in a known way in accordance with a flip flop signal DFF supplied by a control circuit 11. The flip-flop signal DFF is elaborated on the basis of control pulses CP of the pick-up signal. In reading mode of the heads, the amplified playback, frequency modulated signal coming from the heads known as PB-FM, is output on an output 4 of the mechanical deck 1 and sent through a liaison 5 to an input 6 of a signal processing circuit 7. Said processing circuit 7, is often in the form of an integrated circuit known as a video IC. Said circuit processes the PB-FM signal to extract from it the composite video blanking and syncs signal known as CVBS signal. Said CVBS signal contains the video signal and a composite synchronisation signals known as Csync. As well known the synchronisation signal is for synchronising the scanning of frame and lines of the frame of a cathode ray tube with the video signal. The Csync signal contains the vertical synchronisation pulses that form the vertical synchronisation signal known as Vsync and the horizontal synchronisation pulses that form the horizontal synchronisation signal known as Hsync. The CVBS signal is one of the output signal of the VCR. Said signal is available on an output 8 of the video IC 7. Said output is coupled in a known way to an input 9 of a synchro separator circuit 10. Said circuit 10 often in the form of a dedicated IC extracts the Csync signal from the CVBS signal. The Csync signal is sent to the control circuit. In an embodiment of the invention this circuit is a microprocessor, for instance TMP90. Said circuit 11, among other functions elaborates from said signal a pseudo vertical synchronisation signal, PV signal.

The VCR may also output an On Screen Display signal. Said OSD signal is produced by an On Screen Display generator for instance a microcontroller. In one embodiment of the invention it is the ST92R195 microcontroller. Said On Screen Display generator is in a known way synchronised by means of the composite synchronisation signal, Csync. As explained above in trick mode the vertical synchronisation signal is jammed by spurious vertical pulses. According to the invention, in order to avoid jitter of said On Screen Display, when the VCR is in one of the trick modes the vertical synchronisation signal which is fed to the On Screen Display generator is no more the vertical synchronisation signal which is jammed, but the pseudo-vertical synchronisation signal coming from control circuit 11. In an embodiment of the invention this change is made by means of a controllable switch 13. Said switch 13 has three ends a first 14, a second 15, and a third 16 and two positions, a first and a second. The first end 14 is coupled to an output 17 of the control circuit 11 of the drum 2 that receives the pseudo vertical synchronisation signal. The second end 15 is coupled to an output 18 of the synchro-separator circuit 10 that receives the vertical conventional synchronisation signal. The third end is connected to an input 19 of the On Screen Display generator (OSD) 12. The On Screen Display generator (OSD) 12 is as already said a dedicated circuit that has an input forecast to receive the vertical synchronisation signal. When the switch 13 is in the first position said third end 16 is connected to the second end 15 so that it receives the vertical synchronisation signal coming from the synchro-separator circuit 10. When the switch 13 is in the second position said third end 16 is connected to the first end 14 so that it receives the pseudo-vertical synchronisation signal. The change from one position to the other is made by a logic control signal produced by the On Screen Display generator 12, and delivered on an output 20 of said circuit 12. It could be sent from another circuit coupled to receive a piece of information meaning that the VCR is controlled to be in trick mode.

What is claimed is:

1. An arrangement comprising:

means for providing a signal representative of a first image to a screen, said signal including a vertical synchronization signal, means for providing a pseudo-vertical synchronization signal, generator means for generating a second image, said generator means having at least an input for receiving a signal to synchronize the second image with the first image, control means having an output indicating the mode in which arrangement is functioning, selector means for selectively providing said vertical synchronization signal or said pseudo vertical synchronization signal to said input depending on the output of the control means, wherein the means for providing the signal representative of the first image includes a rotary drum fitted with at least a pair of magnetic heads for reading a magnetic tape and wherein the means for providing a pseudo vertical synchronization signal comprise a control circuit elaborating the pseudo-vertical synchronization signal on the basis of control pulses generated by the rotary drum.

2. An arrangement according to claim 1, wherein the generator means comprises an On Screen Display generator.

3. An arrangement according to claim 1, further including separator means for taking the vertical synchronization signal out of the signal representative of the first image.

4. An arrangement according to claim 3, wherein the selector means are in the form of a switch with a first input connected to the separator means, with a second input connected to the control circuit with a third input connected to the control means and with an output connected to the input of the generator means.

* * * * *